United States Patent
Mulé

(10) Patent No.: US 9,003,457 B2
(45) Date of Patent: *Apr. 7, 2015

(54) MEDIA ENGAGEMENT FACTORS (71) Applicant: Cable Television Laboratories, Inc., Louisville, CO (US)

(72) Inventor: Jean-Francois Mulé, San Francisco, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,572

(22) Filed: Aug. 22, 2013

(65) Prior Publication Data

US 2014/0059576 A1 Feb. 27, 2014

Related U.S. Application Data (60) Provisional application No. 61/691,956, filed on Aug. 22, 2012.

(51) Int. Cl.
| | | |
|---|---|---|
| *H04N 7/18* | (2006.01) | |
| *H04N 7/16* | (2011.01) | |
| *G06T 11/80* | (2006.01) | |
| *H04N 21/442* | (2011.01) | |
| *H04L 12/26* | (2006.01) | |
| *G06T 11/00* | (2006.01) | |
| *G06T 11/20* | (2006.01) | |
| *G06T 19/00* | (2011.01) | |
| *H04N 21/222* | (2011.01) | |
| *H04N 21/414* | (2011.01) | |
| *H04N 21/4223* | (2011.01) | |
| *H04N 21/431* | (2011.01) | |
| *H04W 24/00* | (2009.01) | |
| *H04N 21/485* | (2011.01) | |

(52) U.S. Cl.
CPC .......... *G06T 11/80* (2013.01); *H04N 21/44218* (2013.01); *H04L 43/045* (2013.01); *G06T 11/00* (2013.01); *G06T 11/206* (2013.01); *G06T 19/006* (2013.01); *H04N 21/2223* (2013.01); *H04N 21/41407* (2013.01); *H04N 21/4223* (2013.01); *H04N 21/4316* (2013.01); *H04N 21/44209* (2013.01); *H04W 24/00* (2013.01); *H04N 21/485* (2013.01)

(58) Field of Classification Search
None
See application file for complete search history.

(56) References Cited

U.S. PATENT DOCUMENTS

| | | | | |
|---|---|---|---|---|
| 2008/0091512 | A1* | 4/2008 | Marci et al. | 705/10 |
| 2008/0295126 | A1* | 11/2008 | Lee et al. | 725/10 |
| 2010/0064329 | A1* | 3/2010 | McLaughlin et al. | 725/106 |
| 2011/0063503 | A1* | 3/2011 | Brand et al. | 348/500 |
| 2012/0291073 | A1* | 11/2012 | Friedman | 725/62 |
| 2013/0145384 | A1* | 6/2013 | Krum et al. | 725/10 |
| 2013/0331972 | A1* | 12/2013 | Sagne et al. | 700/94 |

\* cited by examiner

*Primary Examiner* — Jason K Lin (74) *Attorney, Agent, or Firm* — Great Lakes Intellectual Property, PLLC.

(57) ABSTRACT

The generation of engagement factors sufficient to represent user engagement, attention, recognition, interest and/or responsiveness to media being shown or otherwise access through an output device is contemplated. The engagement factors may be values or other representations sufficient to facilitate categorizing viewer activities during playback of particular portions of the media.

18 Claims, 2 Drawing Sheets

MEDIA ENGAGEMENT FACTORS

CROSS-REFERENCE TO RELATED APPLICATIONS

This application claims the benefit of U.S. provisional Application No. 61/691,956, filed Aug. 22, 2012, the disclosure of which is incorporated in its entirety by reference herein.

TECHNICAL FIELD

The present invention relates to generating media engagement factors sufficient to facilitate representing user/viewer engagement while accessing media.

BACKGROUND

Advertisers, studios, television stations, service providers and/or other entities associated with the creation and/or distribution of media may be interested in understanding how closely a user/viewer is engaged or otherwise attentive to the media at particular intervals. Accordingly, one non-limiting aspect of the present invention contemplates facilitating generation of engagement factors sufficient to facilitate representing user engagement, attention, recognition, interest, responsiveness, etc.

DETAILED DESCRIPTION

Figure 1:
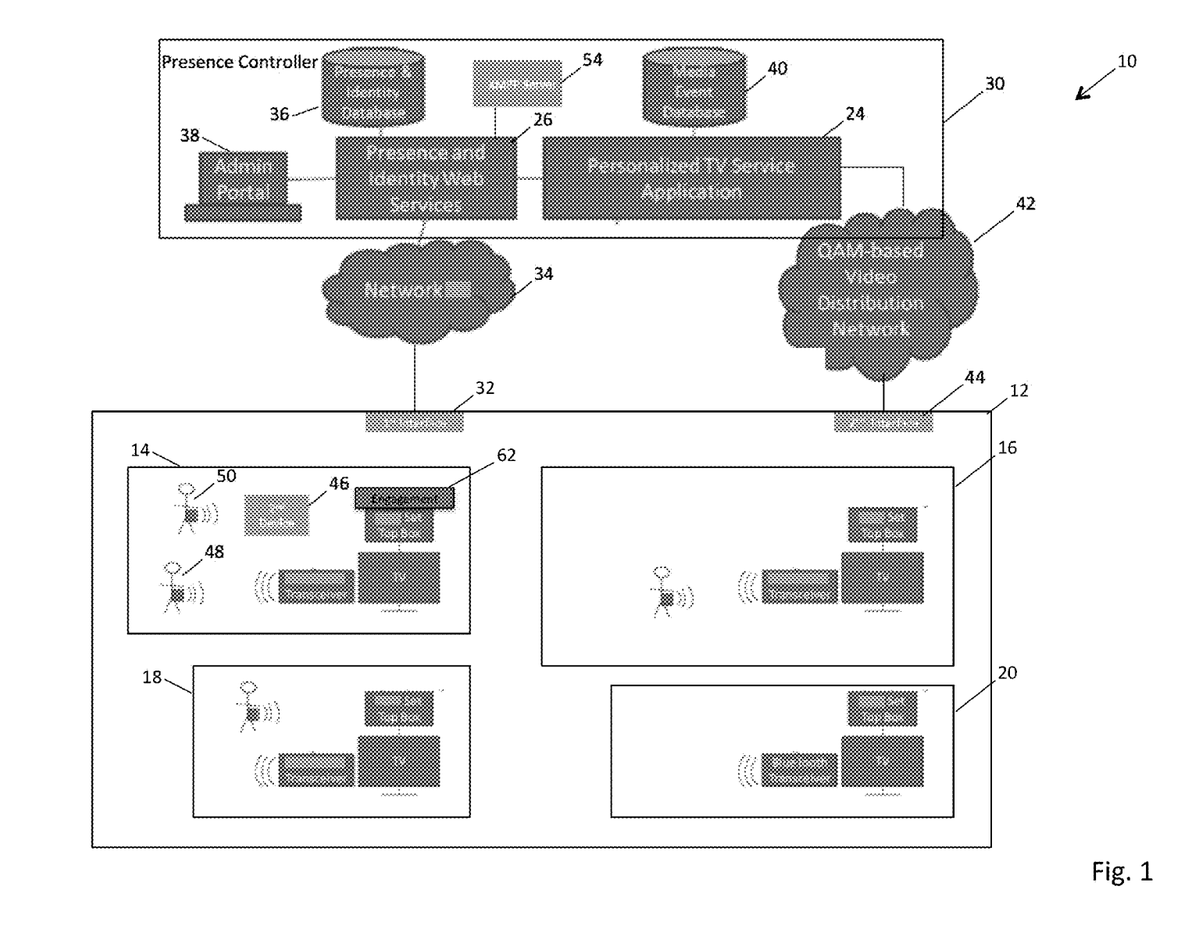
FIG. 1 illustrate a media engagement factor system in accordance with one non-limiting aspect of the present invention.

FIG. 1 illustrates a system 10 for generating media engagement factors in accordance with one non-limiting aspect of the present invention. An engagement factor may be generated as a simple set of one or more indicators to assess the level of interest, engagement, attentiveness, responsiveness, etc. of a viewer with media or particular portions of media, such as portions of content and/or advertisements. When media is output through a TV or other type of output device, media measurement techniques contemplated herein may take into account many companion devices around the TV (remote, phones, tablets, second or third screens) and the dynamic nature of live TV programming where not only programmers but also viewers themselves define the key moments during a show through their social interactions. The system 10 is shown as described in U.S. patent application Ser. No. 13/792,089, the disclosure of which is hereby incorporated by reference in its entirety. The system 10 may included capabilities sufficient to facilitate generating engagement factors, and optionally, to perform presence detection, service personalization and/or other operations, including those associated with identifying presence of particular users/viewers within a dwelling 12 receiving media.

The dwelling 12 is shown for exemplary non-limiting purposes to demonstrate the system 10 being configured to facilitate personalizing services according to occupant(s) presence within one or more of a plurality rooms 14, 16, 18, 20. The dwelling 12 illustrates one of many possible environments where a broad range of services may be made available to a particular location and then subsequently personalized to a narrower range of services depending on occupant presence within certain portions of the dwelling. The services are shown to be personalized on a room-by-room basis such that the services within each room 14, 16, 18, 20 are personalized according to the room's occupant(s). This exemplary illustration is provided without intending to necessarily limit the present invention as other demarcations besides room boundaries may be used for personalization without deviating from the scope and contemplation of the present invention. While the determination of engagement factors with respect to services personalized on a per-room basis or a per-viewer basis is described with respect to the system 10, the present invention is not necessarily so limited and fully contemplates generating engagement factors without detecting presence and/or without personalizing services.

The room-by-room basis for personalization is predominately described with respect to personalizing television related services as one non-limiting aspect of the present invention contemplates allowing television service providers to personalize offerings according to occupants identified to be within each room 14, 16, 18, 20. The personalized offerings are intended to encompass any form of media, content, data, advertisement or other information made available to the dwelling, or particular users currently within with the dwelling 12, and are not necessary limited to the described television services. Each room 14, 16, 18, 20 is shown to include a presence detecting device (transceiver) configured to detect presence of occupants within the corresponding room as a function of wireless signaling, although each room 14, 16, 18, 20 need not necessary include a presence detecting device in order to facilitate room-by-room occupant detection. The wireless signaling used for presence detection may originate from wireless devices carried by the occupants. The occupants may carry a radio frequency identification (RFID) tag/transmitter, a mobile phone, a near field communication (NFC) device or other wireless device sufficient to facilitate transmission of the wireless signaling.

The wireless signaling may include information sufficient to facilitate distinguishing on occupant from another, optionally without specifically identifying the occupant, although specific identification is contemplated. The use of the wireless device may be beneficial in allowing hands-free presence detection of the carrying occupant at least in that contemporaneous engagement may not be required to trigger presence detection after the wireless device is paired or otherwise associated with the presence detecting device. While the present invention contemplates the presence detection devices or other devices within one or more of the rooms 14, 16, 18, 20 being manually engaged to trigger presence detection, such as in the event the occupant is not currently in possession of a suitable wireless device, automatic emittance of the wireless signaling may be preferred in order to minimize user operations. Once presence detection is enabled with one or of the presence detecting devices within the dwelling 12, the other presence detection devices may be notified to facilitate presence detection in the corresponding rooms.

Optionally, the wireless devices may be paired with presence detecting devices in other dwellings (not shown) to facilitate similar operations therein. The wireless devices may be configured to periodically transmit wireless signaling for receipt by the presence detecting devices. A power level of the wireless signaling and/or a capability of the presence detecting devices to receive the wireless signaling may be adjusted according to a size of each room. The wireless signaling range of the wireless devices and/or the presence detecting devices may be adjusted in order to limit the likelihood that a single occupant is determined to be present in multiple rooms at the same time. A range testing operation may be conducted between the wireless devices and the presence detecting devices within each room in order to facilitate establishing the wireless communication ranges. Optionally, the presence detecting devices may include an application through which instructions can be provided to occupants to facilitate establishing the wireless communication ranges.

The presence detecting devices may be configured to facilitate detecting presence of one or more occupants within each of the rooms 14, 16, 18, 20. The presence detection may then be used to facilitate personalizing services provided through a television or other interface of the occupied room. The present invention is not necessarily limited to facilitating media provided through televisions and fully contemplates its use and application in facilitating other types of services, which may not necessarily be interfaced through a television. The televisions are shown for exemplary non-limiting purposes to demonstrate one type of device through which network services may be interfaced. While the television is shown to standalone from other user controllable devices, the television need not be a standalone component and may be integrated in any other type of device, including but not limited to a computer, a mobile phone, a tablet computer, etc. A set top box (STB) is shown to be associated with each of the televisions to facilitate interfacing television related signaling. The STB or other suitable gateway may be associated with the television to descramble, to provide encryption or to otherwise facilitate processing of service related signaling. The STB is shown to be separate from the television for exemplary non-limiting purposes as its function may be integrated with each television and/or its use may be omitted.

The television services may be personalized according to information received at a personalized television (TV) service application 24. The personalized TV service application 24 may be configured to facilitate personalizing the television services according to presence information received from a presence and identity Web services 26. The personalized TV service application 24, the presence and identity Web services 26 and the other illustrated components may be included as part of a presence services controller 30. The controller 30 may include a computer-readable medium having non-transitory instructions stored thereon, which operate with a processor, to facilitate the operations contemplated by the present invention. The presence and identity Web services 26 may be a Web-based server or other device configured to receive notification messages from the presence detecting devices. The notification messages may correspond with an arrival message and a departure message transmitted from one or more of the presence detecting devices to announce arrival and departure of occupants within the rooms. Each presence detecting device may be configured to transmit one or more of the notification messages upon detecting the arrival and departure of occupants. The notification messages may include an identifier for the detected wireless signaling and an identifier of the room for which the arrival and/or departure was detected. One non-limiting aspect of the present invention contemplates the presence detecting devices being configured to transmit the notification messages through a first network interface 32.

The first network interface 32 may be configured to facilitate exchanging signals between the presence detecting devices within the dwelling 12 and a first network 34 external to the dwelling. A first inside network (not shown), such as a wireless or wired network, may be included within the dwelling to facilitate interconnecting each of the presence detecting devices with the first network interface 32. One non-limiting aspect of the present invention contemplates the first network interface 32 being sufficient to facilitate exchanging Internet protocol (IP) layer messaging between the first network 34 and the presence detecting devices. The first network 34 may be configured as an IP-based network having capabilities sufficient to facilitate IP layer message exchange according to according to Hypertext Transfer Protocol (HTTP), the disclosure of which is hereby incorporated by reference in its entirety. The use of an IP-based network to facilitate IP-layer messaging may be beneficial in allowing the presence detecting devices to facilitate communications according to commonly used networking protocols and/or to allow manufacturers to provide off-the-shelf devices to facilitate the contemplated presence detection without requiring such devices to support proprietary communication protocols and messaging commonly employed by television service providers.

The presence and identify Web services 26 may be configured to process information included in the notification message to facilitate determining presence and identity of the occupants. In order to insure occupant security and integrity of collected information, the notification message may include non-descriptive identifiers generated for the occupant originating wireless signaling. The non-descriptive identifiers may be beneficial in preventing use of the underlying information in the event one of the notification messages was to be intercepted by an unintended third party. A presence and identity database 36 may include information sufficient to relate the identifying information in the notification messages to particular users. The presence and identity database 36 may be securely maintained to protect the identity of registered users. An admin portal 38 may be included to facilitate administering the presence and identify information included in the presence and identity database 36. The admin portal 38 may be in the control of a service provider (not shown) responsible for providing the services to the dwelling for personalization. Optionally, in the event the personalization is being used to control a device to personalize content provided from other service providers, the admin portal 38 may be associated with a trusted authentication service or other trusted third party.

The presence and identity Web services 26 may cooperate with the admin portal 38, presence and detecting database 36, backend infrastructures and the like to facilitate determining identification information for particularly dwelling occupants. Optionally, the occupants may provide profiles or other identifying information to facilitate the contemplated identification, such as but not necessarily limit to preference related information representative of the occupant preferences for personalization. The identifying information, and optional preferences, may be provided from the presence and identity Web services 26 to the personalized TV service application 24. The personalized TV service application 24 may use this information to generate personalization information. The personalization information may then be provided on a room-by-room basis to the television in order to personalize the television service relative to the corresponding room occupant(s). A media database 40 may cooperate with the personalized TV service application 24 to facilitate personalizing various television services or other related media according to the particular room occupants, e.g., to personalize content advertised or made available to each room 14, 16, 18, 20 according to the personal preferences of the user identified therein.

A quadrature amplitude modulated (QAM) based video distribution network 42 is shown to facilitate interfacing the television signaling/services with the dwelling. A second interface 44 at the dwelling 12 may be configured to facilitate interfacing the television services related signaling with each of the STBs. A second inside network (not shown), such as a wireless or wired network, may be included within the dwelling to facilitate interconnecting each of the STBs with the second network interface 44. The STBs may include an interface to received scrambled television signaling and a tuner to descramble the scrambled televisions signal, such as in response to commands electronically received from a remote control used to facilitate navigation an included electronic programming guide (EPG). One non-limiting aspect of the present invention contemplates the second network interface 44 being sufficient to facilitate exchanging non-IP layer messaging between the QAM network and the STBs. The QAM network may be configured as a non-IP based network having capabilities sufficient to facilitate non-IP layer message exchange according to according to Enhanced Binary Interchange Format (EBIF), the disclosure of which is hereby incorporated by reference in its entirety. The use of a non-IP-based network to facilitate non-IP layer messaging may be beneficial in allowing the STBs to facilitate communications over legacy networks commonly employed by television service providers to transmit television signaling over proprietary communication mediums. This may be beneficial in allowing the present invention to operate with legacy and/or deployed STBs without requiring the STBs to support IP-based messaging or communications over IP networks and/or IP messaging layers.

While the system in FIG. 1 differentiates between IP based networking and non-IP-based networking, the present invention is not necessarily so limited and fully contemplates its use and application in facilitating personalization according to messaging exchange over similarly configured networks and/or over a single network. In particular, one non-limiting aspect of the present invention contemplates the first interface 32 and the second interface 44 being combined into a single interface and/or the first and second interface 32, 44 being replaced with a single interface sufficient to facilitate IP-based messaging. The IP-based messaging configuration may be beneficial in environments where legacy constraints for the television or other interfacing device are not so limiting and/or where such devices may be configured to facilitate IP-based messaging. Such an all IP-based configuration may provide better long-term implementation and/or implementation with other content sources that do not rely upon proprietary television communication mediums and/or those which are not capable of transmission over such television communication mediums, e.g., for use in personalization of services streamed, downloaded or otherwise delivered over the Internet to televisions or other devices within the dwelling.

The services personalization may include room-level personalization for secondary devices 46, such as but not necessarily limited to tablets, smartphones, computers and/or other devices that may be configured to supplemental occupant experience relative to content interfaced through the television or otherwise being delivered by the service provider. The secondary devices 46 may be configured and/or operable in the manner described in U.S. patent application Ser. Nos. 12/827,147, 13/755,254 and 13/922,386, the disclosures of which are hereby incorporated by reference in their entireties. Such secondary device personalization may cooperate with the personalization provided through the television and/or operated independently thereof, such as to personalize services to a different room occupant, i.e., services interfaced through the television could be personalized to a first room occupant 48 and services interfaced through the secondary device 46 could be personalized to a second room occupant 50. The secondary device personalization may be achieved with secondary personalization message communicated from the personalization TV service application 24 and/or an Extensible Messaging and Presence Protocol 3(XMPP) server 54 to the relevant secondary devices. Optionally, the secondary personalization message may be transmitted to the secondary device 46 using backchannel communication, such as but not necessarily limited to that described in U.S. patent application Ser. No. 13/534,238, the disclosure of which is hereby incorporated by reference in its entirety.

The personalized TV service application 24 and/or the other resources contemplated by the present invention may be configured in accordance with the contemplated concepts to use the knowledge and other information associated with presence of the room occupants, along with that user's recorded preferences and usage history, to create a personalized services and/or to generate personalized engagement factors for the user. In particular, the system 10 may be beneficial in personalizing video services, including, but not limited to: recommended programming; personalized programming guide; links into social networking tools so that the user can see what his or her friends watched and liked, or can see what friends are watching right now; automatically tuning the channel to the program that the user usually watches at this time of day and day of week; automatically generating playlists of recommended programming based upon user preferences and viewing history; targeting specific advertisements to the user based upon preferences, viewing history, psychographic or demographic information, and other externally-supplied information about the user; and/or supplying de-identified and aggregated statistics to advertisers, agencies, marketers, content packagers and content creators.

One non-limiting aspect of the present invention proposes to define and/or measure a series of engagement factors based on one or a combination of the following:

1. Viewer gestures on second screen apps: the number, type, and speed of certain gesture events at key moments in a TV program, such as in the manner described within U.S. patent application Ser. No. 13/931,846, the disclosure of which is hereby incorporated by reference in its entirety.

2. STB remote events including key presses (number, type, speed, force of key press), gyroscopic sensors (more remote will have gyroscopes and the data from these sensors will be indicators of the viewer's engagement)

3. Other TV or STB related information (on/off/standby/picture-in-picture/IR sensors about movement in the room)

4. One or more list of key moments (time offset or absolute, and variable moment weights). One list may be provided by the programmer at content creation (movie, cartoon) and generate a series of engagement factors for program consumption. One list may be viewer-defined based on crowd sourced tweets and social network trendings during a show. And one list may be provided by advertisers who want to measure the user engagement in many different ways depending on the ad and the level of show engagement before and after the ads.

One non-limiting aspect of the present invention contemplates fusing the various input sources (items numbered #1 to #3 above) with a set of program moments and weights (item #4 above) to generate one or more results called engagement factors.

A series of engagement factors may be computed and updated in near-real time or at various intervals. A programmer, advertiser or crowd source may be used to identify time offsets and their respective engagement weights. For some program types (movie, series, cartoons), these time offsets and weights may be known at the time the content is created. In this case, the engagement factor computation model may be fed with a list of time_offsets, weights, and potentially list of gestures that matter more than others—volume down or mute on American Idol means more than on a Charlie Chaplin movie or nature program with aquatic footage). For some program types (live TV especially sport, live performances), these time offsets may be dynamically generated live by the programmer or a third-party watching the show in real-time. In this case, the computation model may be such that atomic metrics may be collected with time offsets and the engagement factor(s) may be calculated with some lag time (e.g. during the season finale of a program, a show moment is the last 10s of the two top performers. Once the start-stop time of a sequence with a higher engagement factor is known, the weight may be provided to the computational model and the engagement factor is calculated (or recalculated then.

One non-limiting aspect of the present invention contemplates defining a method for fusing all these real-time events together by using three parallel processes:

The applications collecting atomic audience metrics simultaneously on the second screen, STB, TV, remote, sensors: these applications measure all atomic gesture, key press and other events and their time (absolute, offset);

The program owner or third-party distributes a list of sequence times and variable weights at various moments. This distribution can be done in real-time (interesting area to explore for interactivity and trigger gamification concepts and opportunities around shows) or it could be post-show (to re-calculate based on different requirements or marketing views)

The measurement process merges these various sources to output the engagement factors.

One non-limiting aspect of the present invention may be to define and/or compute the various engagement factors for the entire duration of the show, or during certain key program sequences based on:

Gestures on a second screen app, such as it may be OK for viewers to interact with second screen apps or TV remote during first two minutes of a program as the show is about reviewing the prior episode content, or in many cases, the viewer checks program info or cast members or what else is on TV.

TV remote key presses: "Volume Up" during program content means something and could impact the engagement factor; and "Volume Down" during program content to a level below 50% of the average of the volume level since the short started means lesser engagement (viewer is distracted by something other than the screen).

Online social interactions around the TV program (any or all online events, or just for a particular viewer's graph).

Certain types of second-screen interaction during an intense moment where the storyline or plot is being build up, or during a suspense sequence may mean: the user is not deeply engaged with content on TV; and/or the user is deeply engaged because it was inside a social network application within −2 and +3 seconds of a show moment that is determined to have a high weight on the social sphere: the subscriber likely interacted with the second screen app during this period based on a keyboard while being logged in to the show.

One non-limiting aspect of the present invention contemplates attempting to associate certain meanings and weight factors to some gesture events defined in the other accompanying patent, for example: a gesture tap on show cast member means +x in confidence factor at any time; and/or a gesture tap on a program of channel other than the one on the current screen for a show start time close to "now" means "−y" is the user has been on this channel for more than 2 minutes. An algorithm may be used that is generic enough to assign weights based on gestures on second screen TV guide events and compound them based on show timeline or TV viewing timescale (e.g., if you have been on this channel in the previous x minutes, it means something more if you zap than if you stayed on it for 2 seconds; if you go to view another show and we decreased the engagement factor by x but you return within the following 4 minutes then an increase may be performed for the engagement factor by y and y>x).

The computation of the engagement factor may be defined as: Ef(t)—defines the engagement factor a time offset t as the weighted sum of the previous engagement factors: Ef(t)=sum for time=0 to time=t of (Weight(time)*Ef(time)*TouchWeight(tdelta_time)*KeyPressWeight(tdelta_time)) divided by sum of all Weights(time)) where tdelta_time is a variable time range to take into account the fact that some gesture events at t−2 seconds affect the engagement at time t; Ef(show)=Ef(duration of show) if viewer stayed for entire show; and/or a weight(time) for online social networks may be the weight obtained by crowdsourcing the social information about the show at the specific time plus social_offset (time it takes to type tweets and for them to be posted and filtered). The weight may be a function of the number of tweets and tweets by folks known to have a lot of followers around these shows could more weight and social media postings/inputs.

One non-limiting aspect of the present invention contemplates a flexible yet simple framework and a means for equation summing the level of engagement during a show based on many devices and social interactions and to allow many different projections of an engagement (allow many toggles and configurability of the model based on the multiple weight lists)—an advertiser may want to evaluate how much an ad on TV makes a social buzz and a programmer wants to know if this same ad keeps the viewer engaged in the show after the ad. With the contemplated data analysis and the evolution of data analytics, the present invention can envision seeing a day when all of these data sets can be fused in real-time. Better engagement factors mean more ad revenues, better targeting and enhance more revenues. A program owner, an advertiser or an online crowd of users on a social network may define a list of key moments associated with a TV program—the parts of the show that have higher importance to measure the engagement of TV Viewers. For live TV, these key moments may be defined during the show itself (a home run, a touch down, an emotional cry during a song performance, . . . ). These key moments may also be defined based on what's trending online and other crowdsourcing methods on social nets (for the entire show or just for a particular viewer social graph).

Figure 2:
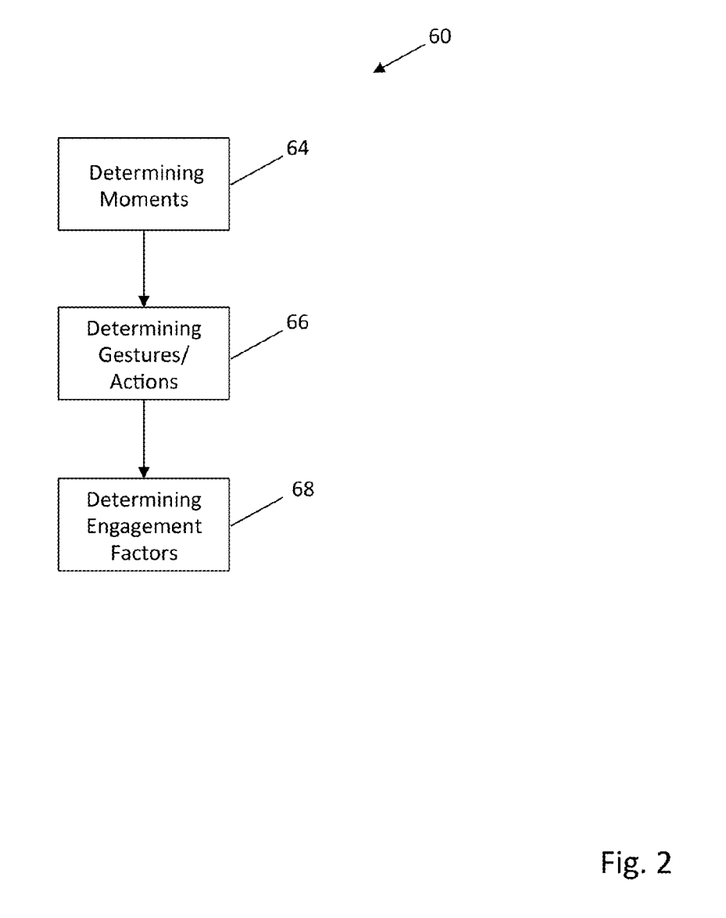
FIG. 2 illustrates a method for generating media engagement factors in accordance with one non-limiting aspect of the present invention.

FIG. 2 illustrates a method for determining engagement factors for a viewer/user in accordance with one non-limiting aspect of the present invention. The method may be embodied in a computer-readable medium having non-transitory instructions, operable with a processor, such as a processor included within an engagement controller 62 of the STB or other device interfacing media with the viewer or otherwise sufficiently position to facilitate the operations contemplated herein. The method is predominantly described with respect to facilitating generation of engagement factors for a viewer viewing a program included within television signaling transmitted from a television service provider for exemplary non-limiting purposes as the present invention fully contemplates its use and application in facilitating generation of engagement factors for any other type of media, including media interface through computers, mobile phones and other devices besides a television. The engagement factors are described with respect to values, such as but not necessary limited to alphanumeric values, intended to provide a relative scale or other when a differentiation regarding viewer engagement during media playback, which again is done for exemplary non-limiting purposes of the present invention fully contemplates generating the engagement factors to represent non-value or non-alphanumeric representations of viewer engagement.

Block 64 relates to determining moments within the media for which engagement factors may be desired. The moments may correspond with portions of the media during which it may be beneficial to generate an engagement factor. One non-limiting aspect of the present invention contemplates generating multiple engagement factors in order to represent viewer engagement during different portions of the media. The media may be segmented, divided or otherwise parsed according to key and non-key moments where the key moments correspond with events, content, advertisements or other portions of the media of particular interest whereas the non-key moments correspond with less significant or less interesting portions of the media. The differentiation between key and non-key moments may be based on various factors, such as but not necessarily limited to moments identified by a service provider, advertiser or other entity prior to transmission or broadcast of the media and/or inputs collected from social media or other crowdsourcing entities having capabilities sufficient to assess and/or determine portions of the media deemed to be of more interest based on habits, preferences or behaviors of additional viewers/users of the same or similar media.

The key and non-key moments may be identified according to timestamps, temporal offsets, embedded markers or other techniques sufficient to differentiate one portion of the media from another portion of the media. One non-limiting aspect of the present invention contemplates the key moments spanning portions of the media such that a summation of each key moment comprises less than 75% of an entire running length of the media, which may be beneficial in limiting the number of engagement factors being generated and/or in otherwise ameliorating processing associated with monitoring viewer behaviors. The key and non-key moments, or other designations employed to differentiate portions of the media, may be listed in a moments table or other database having capability sufficient to facilitate cross-referencing each moment relative to an offset or other data marker sufficient to facilitate identifying its position within the media, such as from a beginning of the media, a time of day and/or with a universal indicator. In this manner, the key moments may be differentiated from the non-key moments in order to ascertain the portions of the media for which engagement factors are predominantly desired. While the present invention contemplates generating engagement factors for the key moments, similar engagement factors or factors related to the operations contemplated herein may be similarly used to facilitate assessing viewer behaviors during non-key moments.

Block 66 relates to determining activities associated with the viewer in order to facilitate generating the engagement factors. The activities may correspond with any electronically determinable process undertaken by the viewer, such as but not necessary limited to commands issued by the viewer to facilitate controlling a second screen device, the STB, a mobile phone or other electronically operable device. The activities may also correspond with facial recognition, presence detection, movement detection or other device driven means for detecting movement, behavior, stress, biometric information or other features of the viewer that may lend itself to determining engagement with the media. One non-limiting aspect of the present invention contemplates continuously monitoring and/or recording viewer activities during media play, which may optionally include differentiating those activities according to whether they were made during one of the key or non-key moments. The viewer activities registered during and/or proximate to key moments may be referred to as gestures and the viewer activities registered during and/or proximate to non-key moments may be referred to as actions. This differentiation may be beneficial and demarcating engagement relative to corresponding portions of the media.

The gestures and/or actions may be registered, detected or otherwise ascertained from one or more sources simultaneously such that multiple gestures and/or actions may be determined for the same portion of the media, thereby causing multiple gestures and/or actions to be associated with a single one or more of the key and non-key moments. A timestamp, offset or other reference may be associated with each of the determined gestures and/or actions in order to facilitate cross-referencing with the moments list or other database used to identify the key moments relative to a timeline of the media. The temporal offsets associated with the activities may then be cross-referenced with similar temporal offsets associated with the key and non-key moments in order to facilitate categorizing actions into the gestures and actions categories. The gestures and/or actions may be further characterized and/or weighted according to a type or other description dependent on a context of the corresponding action, e.g., an activity (gesture or action) may be characterized as a first type when occurring at beginning of the media (first two minutes, etc.) and the same activity may be characterized as a second type when occurring at some point after the beginning.

Block 68 relates to determining engagement factors based on the determined activities. The engagement factors may be determined for any portion of the media based on the activities of the viewer made during a corresponding portion of the media. The engagement factors may be based on an initial or first engagement value or benchmark set for the corresponding portion of the media, which for exemplary purposes is assumed to be limited to the key moments. Each key moment may be initially assigned the same first engagement value and thereafter adjusted according to one or more the activities in order to generate a second engagement value whereby the second engagement value becomes the engagement factor. Optionally, multiple engagement factors may be determined for the same key moments in order to assess engagement according to various influences, optionally with different initial or first engagement values (i.e., some activities sources may be assigned different initial values depending on how well the correspondingly measured activities related to an accurate assessment of engagement).

One non-limiting aspect of the present invention contemplates adjusting the first engagement value assigned to a particular key moment with a weighted value. The weighted value may be calculated from the gestures and/or actions occurring during or proximate to the corresponding key moment in order increase or decrease generate the second engagement value (engagement factor) as an increased or decreased representation of the first or initial engagement value assigned to it. In particular, one non-limiting aspect of the present invention contemplates increasing the first engagement value if the corresponding gesture is of a first type (e.g., the gesture occurs within the first two minutes of the media) and decreasing the first engagement value if the corresponding gesture is of a second type (e.g., the gesture occurs after the first two minutes of the media). In this manner, the same gesture may generate different engagement factors depending on its occurrence during the media. The corresponding increase/decrease may correspond with a respective higher/lower level of viewer engagement (e.g., greater values represent more engagement and lower values represent less engagement). Optionally, the actions occurring during non-key moments on either side of the key moment of interest may be used to further adjust the weighted value, i.e., a smaller change to the weight value may occur if the action occurred during a non-key moment rather than during the key moment of interest.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Accordingly, the present invention has been described with some degree of particularity directed to the exemplary embodiments thereof. It should be appreciated, though, that the present invention is defined by the following claims construed in light of the prior art so that modifications or changes may be made to the exemplary embodiments of the present invention without departing from the inventive concepts contained herein.

What is claimed is:

1. A method for determining engagement factors for a viewer accessing media being interfaced through an output device, the method comprising:
   determining a set-top box (STB) having:
   i) an interface configured to receive scrambled television signals from a service provider;
   ii) a tuner configured to descramble the received television signals for display on the output device;
   determining second screen device within audio range of the output device, the second screen device being operable to augment a program being played on the output device;
   generating engagement factors sufficient for representing viewer engagement during playback of the program on the output device, the program being included within the scrambled television signals and being descrambled with the tuner for display on the output device, including generating one or more of the engagement factors as a function of gestures made by the viewer during playback of the program in response to events executing on the second screen device, including assigning each gesture a timestamp associated within a corresponding event executing on the second screen device proximate thereto;
   comparing a first audio sample with at least a plurality of second audio samples, the first audio sample being of audio as emitted from the output device as a result of interfacing content from the service provider, the first audio sample being sampled with the second screen device, the plurality of second audio samples being of audio as emitted from the service provider to the tuner;
   identifying a matched audio sample as a one of the second plurality of audio samples most closely matching the first audio sample;
   determining a timing difference between the first audio sample and the matched audio sample;
   synchronizing events executing on the second screen device based on the timing difference:
   comparing a third audio sample of audio as emitted from the output device interfacing the content from the service provider with one or more of a plurality of fourth audio samples of audio as emitted from the service provider to the tuner, the third audio sample being sampled by the second screen device after the first audio sample is compared with the plurality of second audio samples, the plurality of fourth audio samples audio samples being recorded prior to the third audio sample;
   identify an additional matched audio sample, the additional matched audio sample being the one of the plurality of fourth audio samples most closely matching with the third audio sample;
   determining an additional timing difference between the third audio sample and the additional matched audio sample; and
   re-synchronizing events executing on the second screen device based on the additional timing difference.

2. A system comprising:
   a set-top box (STB) having:
   i) an interface configured to receive scrambled television signals from a service provider;
   ii) a tuner configured to descramble the received television signals for display on a television;
   a second screen device within audio range of the television, the second screen device being operable to augment the program being played on the television, the second screen device including an engagement controller configured to generate engagement factors sufficient for representing viewer engagement during playback of the program on the television, the program being included within the scrambled television signals and being descrambled with the tuner for display on the television, the engagement controller generating one or more of the engagement factors as a function of gestures made by the viewer during playback of the program in response to events executing on the second screen device, including assigning each gesture a timestamp associated within a corresponding event executing on the second screen device proximate thereto, wherein the engagement controller is configured for:
   i) comparing a first audio sample with at least a plurality of second audio samples, the first audio sample being of audio as emitted from the television as a result of interfacing content streamed from the service provider, the first audio sample being sampled with the second screen devices, the plurality of second audio samples being of audio as emitted from the service provider to the tuner;
   ii) identifying a matched audio sample as a one of the second plurality of audio samples most closely matching the first audio sample;
   iii) determining a timing difference between the first audio sample and the matched audio sample;
   iv) synchronizing events executing on a device based on the timing difference;
   v) comparing a third audio sample of audio as emitted from the television interfacing the content streamed from the service provider with one or more of a plurality of fourth audio samples of audio as emitted from the service provider to the tuner, the third audio sample being sampled by the second screen device after the first audio sample is compared with the plurality of second audio samples, the plurality of fourth audio samples audio samples being recorded prior to the third audio sample;

vi) identify an additional matched audio sample, the additional matched audio sample being the one of the plurality of fourth audio samples most closely matching with the third audio sample;

vii) determining an additional timing difference between the third audio sample and the additional matched audio sample; and viii) re-synchronizing events executing on the second screen device based on the additional timing difference.

3. The system of claim 2 wherein the engagement controller is configured for:

assigning first, second and third gestures respectively first, second and third values; and calculating a first engagement factor of the one or more determined engagement factors for a first key moment of the determined key moments, including calculating the first engagement factor as a function of the first, second and third values.

4. The system of claim 3 wherein the engagement controller is configured for determining the first engagement factor to be equal to:

the first value in the event the first gesture is made proximate to the first key moment in the absence of the second and third gestures being made;

the second value in the event the second gesture is made proximate to the first key moment in the absence of the first and third gestures being made; and the first value in the event the third gesture is made proximate to the first key moment in the absence of the first and second gestures being made.

5. The system of claim 4 wherein the engagement controller is configured for:

determining one or more actions, if any, made by the viewer proximate in time to occurrence of the non-key moments; and adjusting the first engagement value relative to the first, second and third values as function of actions made proximate to the first key moment.

6. The system of claim 5 wherein the engagement controller is configured for increasing the first engagement value when a first action of the determined actions is made proximate to the first key moment and decreasing the first engagement value when a second action of the determined actions is made proximate to the first key moment.

7. The system of claim 6 wherein the engagement controller is configured for determining the key and non-key moments as a function of a key moments list, the key moments list identifying key and non-key moments relative to temporal offsets defined from a beginning of the media, each key and non-key moment being identified relative to a different one of the temporal offsets.

8. The system of claim 7 wherein the engagement controller is configured for identifying the key moments as a function of social media inputs, the social media inputs measuring engagement of additional users viewing the media, the social media inputs being determined while the media is being played simultaneously to multiple viewers, the multiple viewers generating the social media inputs.

9. A non-transitory computer-readable medium having non-transitory instructions, operable with a processor, to facilitate generating engagement factors for a viewer watching a program, the non-transitory computer-readable medium including non-transitory instructions sufficient for:

determining a gateway having:

i) an interface configured to receive scrambled television signals from a service provider;

ii) a tuner configured to descramble the received television signals for display on the output device;

determining second screen device within audio range of the output device, the second screen device being operable to augment a program being played on the output device:

generating engagement factors sufficient for representing viewer engagement during playback of the program on the output device, the program being included within the scrambled television signals and being descrambled with the tuner for display on the output device, including generating one or more of the engagement factors as a function of gestures made by the viewer during playback of the program in response to events executing on the second screen device, including assigning each gesture a timestamp associated within a corresponding event executing on the second screen device proximate thereto;

comparing a first audio sample with at least a plurality of second audio samples, the first audio sample being of audio as emitted from the output device as a result of interfacing content from the service provider, the first audio sample being sampled with the second screen device, the plurality of second audio samples being of audio as emitted from the service provider to the tuner;

identifying a matched audio sample as a one of the second plurality of audio samples most closely matching the first audio sample;

determining a timing difference between the first audio sample and the matched audio sample;

synchronizing events executing on the second screen device based on the timing difference:

comparing a third audio sample of audio as emitted from the output device interfacing the content from the service provider with one or more of a plurality of fourth audio samples of audio as emitted from the service provider to the tuner, the third audio sample being sampled by the second screen device after the first audio sample is compared with the plurality of second audio samples, the plurality of fourth audio samples audio samples being recorded prior to the third audio sample;

identify an additional matched audio sample, the additional matched audio sample being the one of the plurality of fourth audio samples most closely matching with the third audio sample;

determining an additional timing difference between the third audio sample and the additional matched audio sample; and re-synchronizing events executing on the second screen device based on the additional timing difference.

10. The medium system of claim 2 wherein the engagement controller is configured for:

determining a plurality of key moments for the program;

determining a plurality of non-key moments for the program, the non-key moments spanning portions of the program other than the key moments; and determining the engagement factors for the key moments and not the non-key moments, thereby limiting the engagement factors to representing viewer engagement during the key moments.

11. The system of claim 10 wherein the engagement controller is configured to identify at least one of the key moments to correspond with an advertisement shown during the program, the corresponding engagement factor representing viewer engagement during the corresponding advertisement.

12. The system of claim 2 wherein the engagement controller is configured for:
   determining a plurality of key moments for the program, including at least a first key moment and a second key moment, each key moment spanning a particular portion of the program, a summation of all the key moments spanning less than 75% of an entire running length of the program; and
   determining the engagement factors to include at least a first engagement factor and a second engagement factor, the first engagement factor representing viewer engagement during the first key moment and the second engagement factor representing viewer engagement during the second key moment.

13. The system of claim 12 wherein the engagement controller is configured for:
   determining the first engagement factor by initially determining a first engagement value and thereafter adjusting the first engagement value by a weighed value, resulting in a second engagement value, the first engagement factor being determined as the second engagement value.

14. The system of claim 13 wherein the engagement controller is configured for:
   determining the weighted value such that the second engagement value is greater than the first engagement value when a first gesture occurring proximate to the first key moment is of a first type, the first gesture being one of the determined gestures; and
   determining the weighted value such that the second engagement value is less than the first engagement value when the first gesture is of a second type.

15. The system of claim 14 wherein the engagement controller is configured for:
   determining the first gesture to be of the first or second type depending on when the first gesture is made.

16. The system of claim 15 wherein the engagement controller is configured for determining the first gesture to be of the first type when made during a first two minutes of the program and to be of the second type when the same first gesture is made after the first two minutes of the program.

17. The system of claim 2 wherein the engagement controller is configured for determining the one or more gestures based at least in part on viewer originating commands electronically detected by the STB.

18. The system of claim 2 wherein the engagement controller is configured to determine the gestures as a function of:
   commands electronically received from a remote control on the second screen device, the remote control being operable to facilitate navigation of an electronic programming guide (EPG) operable to select programs for viewing.

* * * * *